United States Patent [19]

Anderson et al.

[11] Patent Number: 4,677,877
[45] Date of Patent: Jul. 7, 1987

[54] ACCESSORY DRIVE WITH BAND BRAKE

[75] Inventors: Andrew G. Anderson, London; David A. Bullen, Ottowa; Robert G. Ferguson, Wyeridge, all of Canada

[73] Assignee: Canadian Fram Limited, Chatham, Canada

[21] Appl. No.: 771,445

[22] Filed: Aug. 30, 1985

[51] Int. Cl.⁴ .................... F16H 3/44; F16H 57/10
[52] U.S. Cl. .................... 74/785; 192/93 A; 192/106.1; 188/77 R
[58] Field of Search ............ 74/785; 192/93 A, 70.18, 192/70.28, 106.1, 82 P, 84 C; 188/77 R

[56] References Cited

U.S. PATENT DOCUMENTS

| | | | |
|---|---|---|---|
| 2,284,047 | 5/1942 | Edwards | 74/785 |
| 2,813,609 | 11/1957 | Spencer | 192/93 A |
| 2,959,070 | 11/1960 | Flinn | 74/664 |
| 3,082,647 | 3/1963 | Banker | 74/785 |
| 3,386,547 | 6/1968 | Hansen | 192/93 A |
| 4,278,161 | 7/1981 | Mower et al. | 192/106.1 X |
| 4,296,851 | 10/1981 | Pierce | 192/106.1 X |

FOREIGN PATENT DOCUMENTS

| | | | |
|---|---|---|---|
| 225113 | 8/1957 | Australia | 188/77 R |
| 0128311 | 12/1984 | European Pat. Off. | 74/785 |
| 174811 | 9/1906 | Fed. Rep. of Germany | 188/77 R |
| 744488 | 11/1943 | Fed. Rep. of Germany | 74/785 |
| 1110840 | 7/1961 | Fed. Rep. of Germany | 188/77 R |
| 1675159 | 3/1979 | Fed. Rep. of Germany | 192/84 C |
| 364933 | 8/1906 | France | 192/93 A |
| 648689 | 11/1982 | Italy | 74/785 |
| 14450 | of 1905 | United Kingdom | 74/785 |
| 17606 | of 1909 | United Kingdom | 74/785 |
| 336016 | 10/1930 | United Kingdom | 192/93 A |

Primary Examiner—Allan D. Herrmann
Assistant Examiner—Dirk Wright
Attorney, Agent, or Firm—Markell Seitzman; Russel C. Wells

[57] ABSTRACT

A multi-speed accessory drive (10) employing a planetary gear reduction set (12). A cone clutch (89) linked to an output member (84), actuator (200) for moving the cone clutch (89) into engagement with the output pulley (84) and a band brake for selectively inhibiting the rotation of the ring gear (18) of the planetary gear set (12).

13 Claims, 8 Drawing Figures

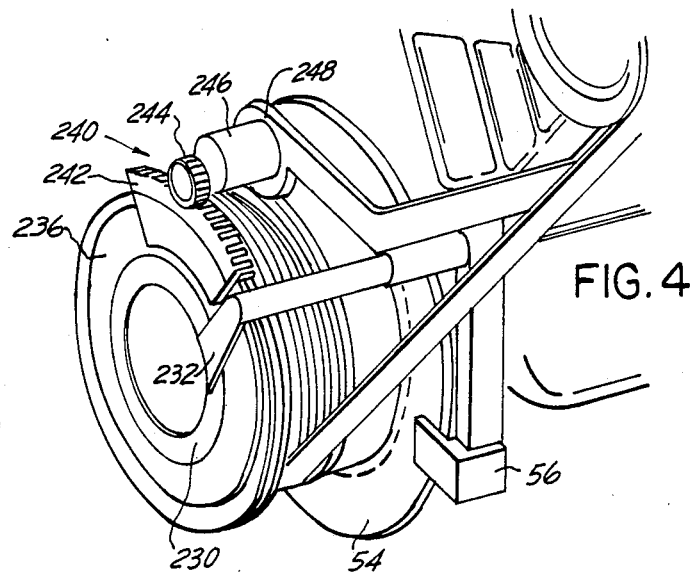
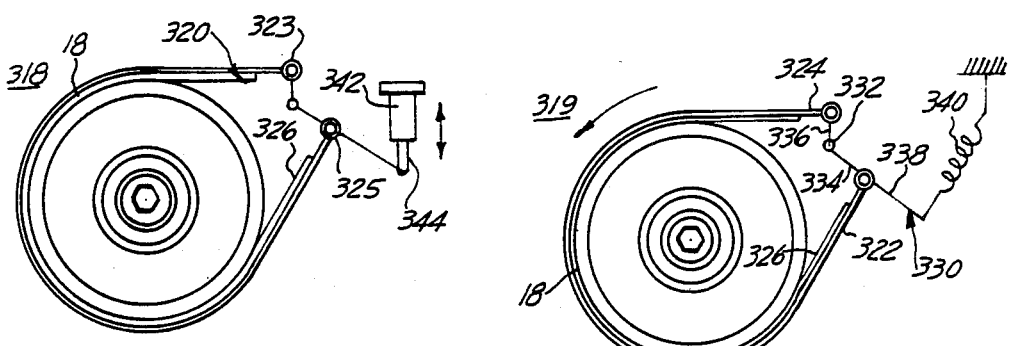
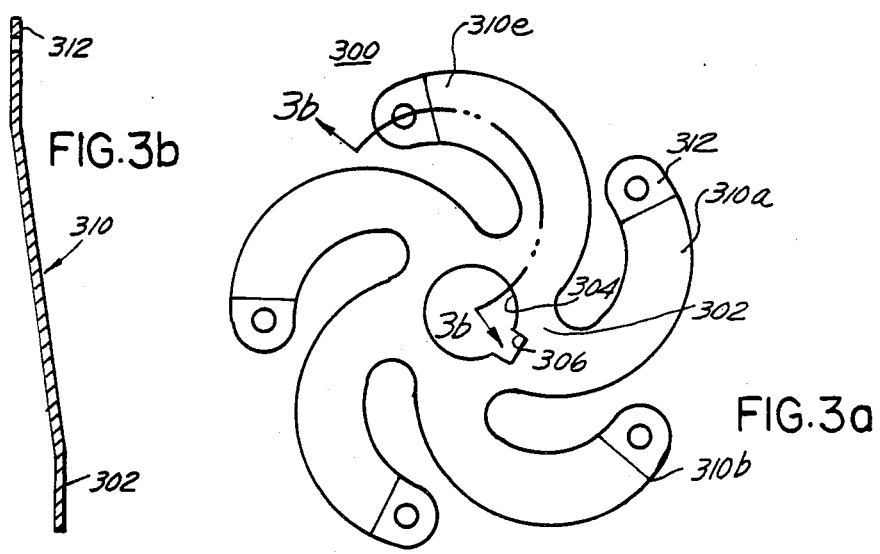

ACCESSORY DRIVE WITH BAND BRAKE

BACKGROUND AND SUMMARY OF THE INVENTION

The invention is related to clutching devices generally and more specifically to an engine driven apparatus for driving at least one vehicle mounted accessory at either one of two selectable speeds.

Planetary gear sets are often used in drive units for speed changing applications by selectively restraining one of either the ring gear, the sun gear or the planet gear carrier. One such drive unit is illustrated in U.S. Pat. No. 2,959,070. In the context of an accessory drive unit for automotive applications the planet gear set may be employed as a means for driving the accessory at a speed that is different from the speed of the engine (crankshaft). Overdriving the accessory, that is, to drive it faster than the speed of the engine reduces the useful life of the gear unit and often generates an unacceptable level of accoustic whine. Further, prior drive units have used planetary gear sets to drive the accessory at only either of two speeds, the first speed being equal to input speed and the second speed differing from the first by the effective gear ratio of the gear set. Further, when driving through the planetary gear set, it is necessary to selectively fix one of its components from rotating to achieve one of the two output speeds. Such means for fixing the rotation of the gear set components include, for example, extentions to the ring gear, planetary carrier or sun gear which engaged by means of a brake, such as a brake caliper, adding size, weight and cost to the accessory drive.

It is an object of the present invention to provide an engine driven, clutched drive capable of driving a belt driven accessory to full speed and reduced speed. A further object is to provide such a device utilizing a speed reducing planetary gear set. An additional object of the present invention is to provide means for performing the clutching function in a simple manner. A further object of the present invention is to provide a self-actuating braking device which automatically affectuates speed changes.

Many other objects and purposes of the invention will become apparent from the detailed description.

Accordingly the invention is directed to a multi-speed accessory drive having a plurality of operating conditions in which an output member is rotated at the speed of an input or driving member or at a reduced speed ratio. The drive comprising a planetary gear set including a sun gear, a plurality of planet gears and a ring gear interconnected with the sun gear, wherein the sun gear is drivingly connected to the input member and the planet gears are drivingly connected to the output member. The drive further includes a driving link rotatably fixed to the input member including spring means fixed to the driving member and to a pressure plate for rotating the pressure plate and for axially urging the pressure plate away from the driving link and clutch means comprising the pressure plate axially movable relative to the input member. The drive additionally includes means for moving the pressure plate into contact with and for rotationally engaging the output member and for alternatively drivingly connecting the output member to the input member; and means for self-disengaging the ring gear during intervals when the pressure plate is in engagement with the output member to permit the output member to rotate at the speed of the input member and for automatically halting the rotation of the ring gear when the pressure plate is disengaged from the output member to permit the output member to rotate at a predetermined ratio of the speed of the input member.

BRIEF DESCRIPTION OF THE DRAWINGS

In the drawings:

FIG. 3a is a front view of an alternate embodiment of the drive link shown in FIG. 1.

FIG. 3b is a side plan view of the alternate drive link of FIG. 3a.

FIG. 4 is a projected view of the embodiment of the invention shown in FIG. 1.

FIGS. 5 and 6 illustrate an alternate braking mechanism.

FIG. 7 illustrates an actuation arm shown in FIGS. 5 and 6.

DETAILED DESCRIPTION OF THE DRAWINGS

Figure 1:
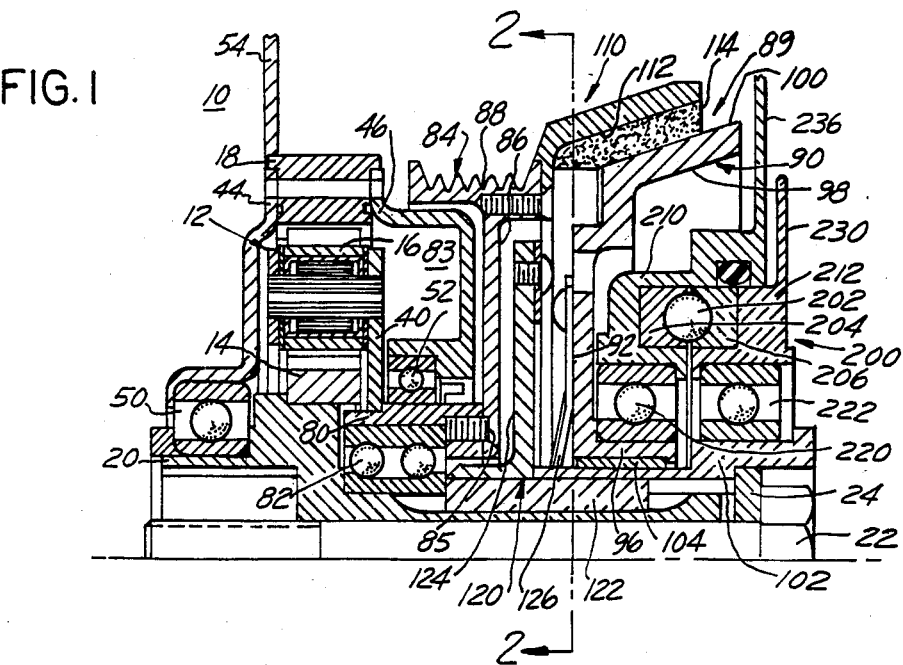
FIG. 1 is a partial cross-sectional view of a multi-speed accessory drive constructed in accordance with the present invention.

Reference is now made to the accompanying FIGURES which illustrate a multi-speed accessory drive 10 which incorporates an off-mode of operation. With reference to FIG. 1, the drive 10 incorporates a speed reducing planetary gear set generally indicated as 12 comprising a sun gear 14, a plurality of planet gears 16 positioned in surrounding relation relative to the sun gear and a ring gear 18 positioned in driving relation about the plurality of planet gears. FIG. 1 illustrates but one of the planet gears 16, such construction being known to one familiar with the art.

The sun gear 14 is mounted to and rotates with an input member or shaft 20 which as illustrated in FIG. 1, supports a number of other components of the drive 10. The shaft 20 is connected to a rotating member of the engine, such as its crankshaft (not shown) by means of a bolt 22 and a washer 24. The planet gears 16 are connected to a planet carrier 40 which is connected to an axially extending hub 80 concentric to the input member 20. The ring gear 18 is positioned by housing members 44 and 46 which are isolated from the input member 20 and an axially extending hub 80 by bearings 50 and 52. The housing members 44 and 46 define a lubrication cavity 83 for oil or the like. In the embodiment of the invention shown in FIG. 1 a disk 54 is attached to and rotatable with the ring gear 18. The rotation of the ring gear 18 and disk 54 is controlled by a braking device such as the brake caliper 56 shown in FIG. 4. The caliper 56 may be pneumatically or hydraulically activated in a known manner in response to control signals. FIGS. 5 and 6 illustrate an alternate means 319 for stopping the rotation of the ring gear 18.

Returning to FIG. 1 it can be seen that the planet carrier 40 extends radially downward from the planet gears and is attached to the hub 80 which is rotationally supported relative to the input member 20 by a bearing 82, such as the double race bearing. The hub 80 supports an output pulley 84 which may be attached thereto by screws 85 or similar means. The pulley 84 comprises a radially extending portion or member 86 which terminates at a pulley face 88.

The drive 10 further includes a cone clutch 89 which includes a pressure plate 90. The pressure plate 90 includes a radially extending portion 92 and a conically shaped ring 98 coaxially positioned to the shaft 20. The ring 98 includes a tapered surface 100 which acts as a conical engagement surface as hereinafter described. The base 96 of the pressure plate 90 is supported and rotationally isolated from the shaft 20 by a spacer 102 and a bushing 104. In this manner the pressure plate 90 is free to move axially on the bushing 104.

The cone clutch 89 further includes a cover 110 comprising a tapered inner surface 112 which supports a ring of a friction material 114, which acts a conical friction surface for engagement with the tapered surface 100. The cover 110 extends from and rotates with the pulley 84.

Figure 2:
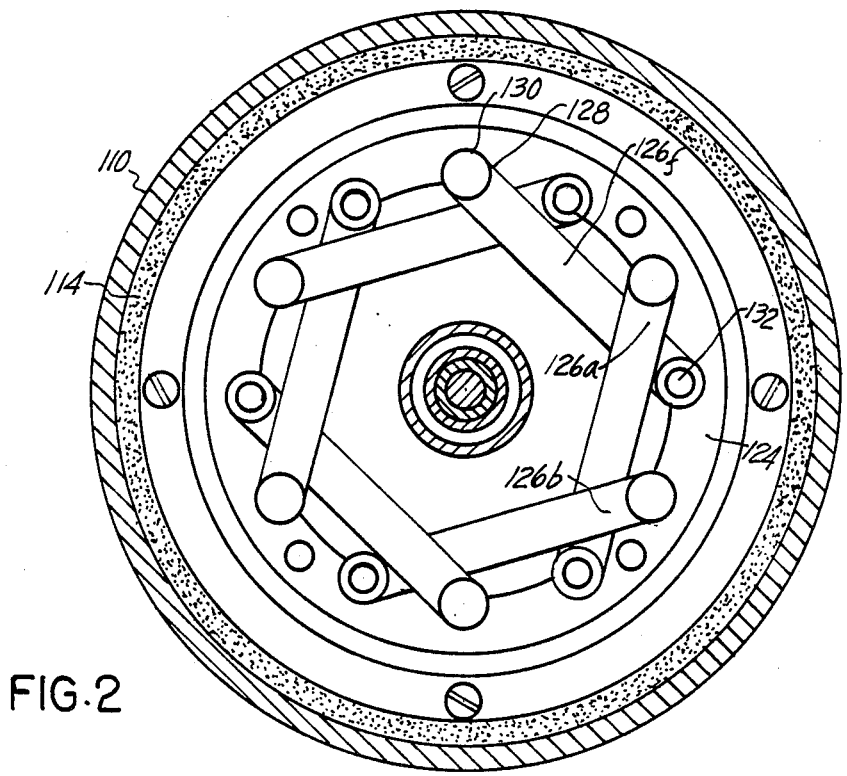
FIG. 2 is a cross-sectional view of the drive illustrated in FIG. 1.

A drive link 120 is positioned between the pulley 84 and the pressure plate 90. The drive link 120 is attached to and rotates with the shaft 20. A key 122 may be used to connect the drive link 120 to the shaft 20. The drive link 120 includes a radially extending portion 124 which supports a plurality of springs 126a-f, shown in greater detail in FIG. 2. The springs 126 in the embodiment of the invention shown in FIGS. 1 and 2 comprise a plurality of leaf springs which are attached at one end generally shown as 128 by rivots 130 or the like to the radial portion 124 of the drive link 120 and attached at their other end 132 to the radially extending portion 92 of the pressure plate 90.

An alternate embodiment of the drive link 120 is shown in FIG. 3a and generally designated as 300. This alternate embodiment combines the structural features of the drive link 120 and the springs 126 into a unitary structure. More specifically the drive link 300 comprises a central hub 302 defining an opening 304 which is sized to receive the shaft 20. A side view of the drive link 300 is shown in FIG. 3b. The hub 302 further includes a keyway 306 for receiving a key such as key 122 as previously described. Radially sweeping outward from the hub 302 are a plurality of flexible spring-like arms 310a-e which also extend axially outward from the hub 302 and terminate at ends 312. The ends 312 are substantially flat and are adapted to be attached to the radial portion 92 of the clutch plate 90 in the manner that the springs 126 were attached.

The pressure plate 90 is clutched or moved into contact with the friction material 114 by the operation of an actuator 200 shown in FIG. 1. One such actuator is a ball ramp actuator which includes a plurality of balls 202 supported by a plurality of ball ramps 204 and 206 in a known manner. The ramps 204 and 206 are each supported by their respective ramp support members 210 and 212. These ramp support members are rotationally isolated from the input member 20 by means of the thrust bearings 220 and 222. More specifically, bearing 220 supports the ramp support member 210 relative to the base 96 of the pressure plate 90 while bearing 222 supports the other ramp support member 212 relative to the spacer 102 secured relative to the input member 20 by a key 122.

To activate the ball ramps 204 and 206 their respective ramp supports 210 and 212 are rotated relative to one another. This is accomplished by securing the circular flange 230 of the support 212 to a bracket 232 which is attached to the engine block as shown in FIG. 4. The circular flange 236 of the support 210 is moved by a rack and pinion mechanism, generally designated as 240. This mechanism 240 comprises a rack 242 secured to the flange 236, and a pinion gear 244 driven by a motor 246. The motor 246 is responsive to control signals generated by an electronic control unit (ECU) (not shown) and secured by a bracket 248 to the engine. In this manner the ramp support 210 can be rotated either clockwise or counter clockwise relative to the ramp support 212 thus causing the clutch plate 90 to move axially inward and outward relative to the friction material 114.

Reference is again made to FIG. 1 which, illustrates the clutch plate 90 in an engaged or clutched mode of operation with tapered surface 100 of the clutch plate 90 engaging the friction material 114. If it is desired to totally disengage the accessory (not shown) driven by the pulley 84, the braking mechanism such as the caliper 56 is deactivated thus permitting the disk 54 to rotate freely and the rack and pinion mechanism 244 is rotated in a manner to cause the ramp support 210 to move to the right as viewed in FIG. 1. The pressure plate 90 will move with the ramp support 210 thereby disengaging it from the friction material 114. In this operating mode the pulley 84 will free wheel about the input shaft. A low speed mode of operation is achieved by maintaining the clutch plate 90 disengaged from friction material 114 as described above and by activating the brake 56 to prevent the disk 54 from rotating. In this operating condition the output pulley 84 is driven through the speed reducing planetary gear set 12 and more particularly, the output pulley 84 is driven through the sun gear 14, the planet gears 16, the planet carrier 40 and hub 80. In this declutched mode of operation, the ring gear 18 will have a tendency to rotate in a direction opposite the direction of rotation of the input shaft. The ring gear rotation is conveniently halted by application of the caliper 56. Having restrained the ring gear 18 from undesired rotation, the output pulley 84 will thereafter rotate at a reduced ratio relative to the speed of the input member 20. When it is desired to increase the speed of the output pulley 84, that is, to drive the pulley 84 at shaft speed, the ramp support 210 is rotated by the rack and pinion mechanism 240 which creates a corresponding relative separating motion between the ramps 204 and 206 causing the ramp 204, the ramp support 212 and thrust bearing 220 to move axially inward toward the pulley 84. This movement of the thrust bearing 220 causes the clutch plate 90 to move into contact with the friction material 114 connected to the output pulley 84. In this operating condition, the output pulley 84 is driven at the speed of the shaft 22 through the key 122, drive link 120, springs 126, pressure plate 90 and friction material 114. In as much as it is undesirable to restrain the ring gear 18 as described for low speed operation the caliper 56 is deactivated.

Reference is now made to FIGS. 5 and 6 which illustrate an alternate means 319 of controlling the rotation of the ring gear 18. This alternate embodiment replaces the disk 54 and braking device 56 previously discussed. With reference to FIG. 6 there is illustrated an end view of the drive 10. As mentioned, the disk 54, which is not needed for this alternate embodiment has been eliminated. Positioned circumferentially about the ring gear 18 is a flexible band 320 having ends 322 and 324 terminating at a short tube or ferrule 323 and 325 respectively. The band 320 supports on an interior side thereof a length of friction material 326. The band 320 and friction material 326 partially circumscribe the ring gear 18. In the preferred embodiment of the invention the friction material 326 wraps about the ring gear 18 for approximately 240 degrees (wrap angle). The alternate braking device further includes a pivotably supported actuation arm generally designated at 330. The arm 330 comprises a lever supported at a fulcrum point generally designated as 332 and includes lever arms 334 and 336. Extending from the arms 334 and 336 are rods 333 and 335 respectively which are loosely received within one of the tubes or ferrules 323 and 325. The rods 333 and 335 are more clearly shown in FIG. 7. It is preferable that lever arm 334 be greater than lever arm 336. In the illustrate embodiment of the invention the ratio of arms 334 to 336 is approximately 2.25. This ratio, as well as the wrap angle of 240 degrees minimizes band tension while permitting placement of these components in the small working space available. The arm 330 includes an extension 338 which is attached to a non-moving part of the engine. The means of attachment of the extension 338 to the engine can be by utilizing a spring 340 or a movable solenoid 342 as illustrated in FIG. 6.

Assuming that extension 338 is attached to the spring 340, the spring 340 will lightly bias the band 320 into engagement with the ring gear 18 as shown in FIG. 5. The rotation of the ring gear 18 in the direction as shown by the arrow causes the band 320 to self-tighten thus providing a braking force to stop the rotation of the ring gear 18. To achieve the low speed mode of operation the actuator 200 is disengaged, that is, the pressure plate 90 is moved out of engagement with the friction material 114. As previously mentioned, in this condition the ring gear 18 will tend to rotate opposite the shaft 20 in the direction shown in FIG. 5. Due to the self-tightening or self-actuating feature of the alternate braking mechanism 319 this undesired reverse rotation of the ring gear 18 is automatically stopped.

During high speed operation the actuator 200 is engaged and as described above, the ring gear 18 will tend to rotate with the shaft 20 in a substantially clockwise direction as viewed in FIG. 5. However, due to the unequal lengths of the lever arms 334 and 336 such rotation of the ring gear 18 will tend to loosen the band 320 situated about the ring gear 18 thus permitting the ring gear to rotate relatively free of the drag forces created by the friction material 326.

A further embodiment of the invention is shown in FIG. 6. The replacement of the spring 340 with a solenoid device 342 having a movable armature 344 permits the end 325 of the band 320 to move inwardly toward the ring gear 18, upon extension of the armature 344 thus moving the band 320 away from the ring gear for total disengagement. The operation of the solenoid device 342 is controlled in concert with the operation of the actuator 200, that is, during the low speed mode of operation, with the actuator 200 disengaged the armature 344 is moved to tighten the band 320 about the ring gear 18 thereby preventing its rotation. During high speed operation with the actuator 200 engaged and the armature is moved to cause the band 320 to move out of engagement with the ring gear 18 permitting it to rotate in the direction of the shaft 20. A cover (not shown) may be utilized to enclose the band 320 and ring gear 18 to protect these structural components from contamination. Retraction of the armature 344 causes the band 320 to move into engagement with the ring gear thus stopping its rotation during low speed operation.

Many changes and modifications in the above-described embodiment of the invention can, of course, be carried out without departing from the scope thereof. Accordingly that scope is intended to be limited only by the scope of the appended claims.

What is claimed is:

1. A multi-speed accessory drive having a plurality of operating conditions in which an output member is rotated at the speed of an input or driving member or at a reduced speed ratio; the drive comprising:
    a planetary gear set comprising a sun gear (14), a plurality of planet gears and a ring gear interconnected with said sun gear, wherein said sun gear is drivingly connected to the input member and said planet gears are drivingly connected to the output member,
    a pressure plate axially movable relative to the input member,
    a driving link rotatably fixed to said input member including spring means fixed to said driving member and to a pressure plate for rotating said pressure plate and for axially urging said pressure plate away from said driving link;
    clutch means comprising said pressure plate axially movable relative to the input member,
    means for moving said pressure plate into contact with and for rotationally engaging said output member and for alternatively drivingly connecting said output member to said input member;
    means for self-disengaging said ring gear during intervals when said pressure plate is in engagement with said output member to permit said output member to rotate at the speed of the input member and for automatically halting the rotation of said ring gear when said pressure plate is disengaged from said output member to permit said output member to rotate at a predetermined ratio of the speed of said input member and
    wherein said moving means includes a ball ramp actuator comprising a plurality of ramp supports rotationally isolated from the rotation of the input member and from said pressure plate and rotationally movable one relative to one another, said ramp supports supporting means for moving said pressure plate axially in response to the relative rotation of said supports and means for rotating said supports relative to one another and
    wherein said rotating means comprises a rack and pinion mechanism connected to one of said ball ramp supports and includes a motor responsive to control signals input thereto for moving said one ball ramp support and wherein the other of said ball ramp supports includes means for preventing same from rotating.

2. The drive as defined in claim 1 wherein said pressure plate is slidably supported relative to said input member by a bushing.

3. The drive as defined in claim 2 wherein said lever arms are angularly disposed one to the other.

4. The drive as defined in claim 3 where the ratio of the lengths of said lever arms is approximately 2.5.

5. The drive as defined in claim 4 wherein said band is approximately 240 degrees of said ring gear.

6. A multi-speed accessory drive having a plurality of operating conditions in which an output member is rotated at the speed of an input or driving member or at a reduced speed ratio; the drive comprising:
    a planetary gear set comprising a sun gear (14), a plurality of planet gears and a ring gear interconnected with said sun gear, wherein said sun gear is drivingly connected to the input member and said planet gears are drivingly connected to the output member, a pressure plate axially movable relative to the input member;

a driving link rotatably fixed to said input member including spring means fixed to said driving member and to a pressure plate for rotating said pressure plate and for axially urging said pressure plate away from said driving link;

clutch means comprising said pressure plate axially movable relative to the input member, means for moving said pressure plate into contact with and for rotationally engaging said output member and for alternatively drivingly connecting said output member to said input member;

means, including a band brake, for disengaging said ring gear during intervals when said pressure plate is in engagement with said output member to permit said output member to rotate at the speed of the input member and for halting the rotation of said ring gear when said pressure plate is disengaged from said output member to permit said output member to rotate at a predetermined ratio of the speed of said input member, and wherein said band brake comprises a band partially circumscribing said ring gear, said band supporting a strip of friction material for engagement with said ring gear, said band terminating at a first end and at a second end, a pivoted actuation arm including lever arms of differing length extending from a pivot point or fulcrum, the ends of said lever arms opposite said fulcrum being loosely received at said first end and at said second end of said band; and a solenoid activator movable to a first condition causing said band to be released from said ring gear and to a second condition moving said band into engagement with said ring gear wherein said pressure plate is slidably supported relative to said input member by a bushing.

7. The drive as defined in claim 6 wherein said actuator is moved to said first condition during intervals when said pressure plate is disengaged from said output members and is moved to said second condition during intervals when said pressure plate is in engagement with said output member.

8. The drive as defined in claim 7 wherein said ball ramp actuator comprises a plurlity of ramp supports rotationally isolated from the rotation of the input member and from said pressure plate and rotationally movable one relative to one another, said ramp supports supporting means for moving said pressure plate axially in response to the relative rotation of said supports and means for rotating said supports relative to one another.

9. The drive as defined in claim 8 wherein said rotating means comprises a rack and pinion mechanism connected to one of said ball ramp supports and includes a motor responsive to control signals input thereto for moving said one ball ramp support and wherein the other of said ball ramp supports includes means for preventing same from rotating.

10. The drive as defined in claim 9 wherein said pressure plate is slidably supported relative to said input member by a bushing.

11. The drive as defined in claim 10 wherein said lever arms are angularly disposed one to the other.

12. The drive as defined in claim 11 where the ratio of the lengths of said lever arms is approximately 2.5.

13. The drive as defined in claim 12 wherein said band is approximately 240 degrees of said ring gear.

* * * * *